United States Patent
Doi et al.

(10) Patent No.: US 7,020,492 B2
(45) Date of Patent: Mar. 28, 2006

(54) RADIO

(75) Inventors: Yoshiharu Doi, Gifu (JP); Takeo Miyata, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 401 days.

(21) Appl. No.: 10/239,853

(22) PCT Filed: Mar. 30, 2001

(86) PCT No.: PCT/JP01/02835

§ 371 (c)(1),
(2), (4) Date: Oct. 1, 2002

(87) PCT Pub. No.: WO01/76101

PCT Pub. Date: Oct. 11, 2001

(65) Prior Publication Data
US 2003/0139202 A1    Jul. 24, 2003

(30) Foreign Application Priority Data
Apr. 3, 2000 (JP) .............................. 2000-100565

(51) Int. Cl.
*H04B 1/38* (2006.01)

(52) U.S. Cl. .................... 455/562.1; 75/265; 342/368; 375/375

(58) Field of Classification Search ............. 455/562.1, 455/272, 276.1, 275, 75, 265; 375/332, 349, 375/375; 342/893, 368; 343/824
See application file for complete search history.

(56) References Cited

U.S. PATENT DOCUMENTS

| 5,321,850 | A |   | 6/1994 | Bäckström et al. |         |
|-----------|---|---|--------|------------------|---------|
| 5,875,216 | A |   | 2/1999 | Martin           |         |
| 5,933,112 | A | * | 8/1999 | Hiramatsu et al. | 342/372 |
| 6,393,073 | B1| * | 5/2002 | Eilts            | 375/340 |

FOREIGN PATENT DOCUMENTS

EP    0 718 971 A2    6/1996

(Continued)

(Continued)

OTHER PUBLICATIONS

Hitoshi Yoshino et al.; "An Equalizer with Carrier-Acquisition-during Training (CAT) Algorithm for Mobile Radio", *IEICE Transactions B-11*, vol. J74-B-II, No. 9, Sep. 1991.

(Continued)

*Primary Examiner*—Lee Nguyen
(74) *Attorney, Agent, or Firm*—Westerman, Hattori Daniels & Adrian, LLP

(57) ABSTRACT

A received signal vector (X(t)) from an array antenna (#1 to #4) is subjected to frequency offset correction by a frequency offset correction part (6) and thereafter subjected to adaptive array processing. An error signal (e(t)) is referred to on the basis of an output signal (y(t)) from the adaptive array and a reference signal (d(t)) held in a memory (30) in a reference signal section or a replica signal (d'(t)) output from a forced phase-locking processing part (20) in a section having no reference signal, so that a frequency offset quantity (Δθ) is extracted therefrom by an offset extraction part (100).

10 Claims, 14 Drawing Sheets

| | FOREIGN PATENT DOCUMENTS | |
|---|---|---|
| EP | 0 881 705 A2 | 12/1998 |
| EP | 0 959 568 A1 | 11/1999 |
| JP | 5-218918 | 8/1993 |
| JP | 7-235917 | 9/1995 |
| JP | 8-228208 | 9/1996 |
| JP | 11-046113 | 2/1999 |
| JP | 11-308036 | 11/1999 |
| WO | WO98/39854 | 9/1998 |

OTHER PUBLICATIONS

Hitoshi Yoshino et al.; "An Equalizer with Carrier-Acquisition-during Training (CAT) Algorithm for Mobile Radio", *IEICE Transactions B-11*, vol. J74-B-II, No. 9, Sep. 1991.

* cited by examiner

RADIO

TECHNICAL FIELD

The present invention relates to the structure of a radio unit employed in a base station in radio communication through a portable telephone or the like, and more specifically, it relates to the structure of compensation control of a frequency offset of the radio unit in the base station.

BACKGROUND TECHNIQUE

In recent years, various transmission channel allocation methods are proposed in order to effectively utilize frequencies in the abruptly developing mobile communication system such as a portable telephone set, and some of these methods are put into practice.

FIGS. 12(a) to 12(c) illustrate arrangements of channels in various types of communication systems, i.e., a frequency division multiple access (FDMA) system, a time division multiple access (TDMA) system and a spatial division multiple access (SDMA) system.

The SDMA system is also referred to as a PDMA (path division multiple access) system.

The FDMA, TDMA and SDMA systems are now briefly described with reference to FIGS. 12(a) to 12(c). FIG. 12(a) illustrates the FDMA system, in which analog signals of users 1 to 4 are frequency-divided with radio waves of different frequencies f1 to f4 and transmitted so that the signals of the users 1 to 4 are separated by a frequency filter.

In the TDMA system shown in FIG. 12(b), digitized signals of respective users are time-divided with radio waves of different frequencies f1 to f4 every constant time (time slot) and transmitted so that the signals of the respective users are separated by a frequency filter and time synchronization between a base station and mobile terminal units of the respective users.

On the other hand, the SDMA system is recently proposed in order to improve frequency utilization efficiency of radio waves due to popularization of portable telephone sets. This SDMA system is employed for spatially dividing a time slot at the same frequency and transmitting data of a plurality of users, as shown in FIG. 12(c). In this SDMA system, signals of the respective users are separated through a frequency filter, time synchronization between a base station and mobile terminal units of the users and a mutual interference eliminator such as an adaptive array.

FIG. 13 is a schematic block diagram showing the structure of a transmission/receiving system 200 of a conventional SDMA base station.

In the structure shown in FIG. 13, four antennas #1 to #4 are provided for identifying users PS1 and PS2.

In a receiving operation, outputs of the antennas are supplied to an RF circuit 2101, amplified through a receiving amplifier, frequency-converted with a local oscillation signal, thereafter subjected to removal of unnecessary frequency signals through a filter and A/D converted in the RF circuit 2101, and supplied to a digital signal processor 2102 as digital signals.

The digital signal processor 2102 is provided with a channel allocation reference calculator 2103, a channel alloter 2104 and an adaptive array 2100. The channel allocation reference calculator 2103 previously calculates whether or not the adaptive array can separate signals received from the two users. In response to the result of this calculation, the channel alloter 2104 supplies channel allocation information including user information for selecting frequencies and times to the adaptive array 2100. The adaptive array 2100 weights the signals from the four antennas #1 to #4 in real time on the basis of the channel allocation information, thereby separating only a signal from a specific user.

[Structure of Adaptive Array Antenna]

FIG. 14 is a block diagram showing the structure of a transmission/receiving part 2100a corresponding to a single user in the adaptive array 2100. In the example shown in FIG. 14, n input ports 2020-1 to 2020-n are provided for extracting the signal of the desired user from input signals including a plurality of user signals.

Signals input in the input ports 2020-1 to 2020-n are supplied to a weight vector control part 2011 and multipliers 2012-1 to 2012-n through switching circuits 2010-1 to 2010-n.

The weight vector control part 2011 calculates weight vectors $w_{1i}$ to $w_{ni}$ with the input signals, a training signal, previously stored in a memory 2014, corresponding to the signal from the specific user and an output of an adder 2013. The subscript i indicates that the weight vector is employed for transmission/receiving to/from an i-th user.

The multipliers 2012-1 to 2012-n multiply the input signals received from the inputs ports 2020-1 to 2020-n by the weight vectors $w_{1i}$ to $w_{ni}$ respectively, and supply the results to the adder 2013. The adder 2013 adds up the output signals from the multipliers 2012-1 to 2012-n and outputs the sum as a received signal $S_{RX}(t)$, which is also supplied to the weight vector control part 2011.

The transmission/receiving part 2100a further includes multipliers 2015-1 to 2015-n receiving an output signal $S_{TX}(t)$ from an adaptive array radio base station, multiplying the same by the weight vectors $w_{1i}$ to $w_{ni}$ supplied from the weight vector control part 2011 respectively and outputting the results. The outputs of the multipliers 2015-1 to 2015-n are supplied to the switching circuits 2010-1 to 2010-n respectively. In other words, the switching circuits 2010-1 to 2010-n supply the signals received from the input ports 2020-1 to 2020-n to a signal receiving part 1R when receiving the signals, and supply signals received from a signal transmission part 1T to the input/output ports 2020-1 to 2020-n when transmitting the signals.

[Operation Principle of Adaptive Array]

The operation principle of the transmission/receiving part 2100a shown in FIG. 14 is now briefly described.

In the following description, it is assumed that the number of antenna elements is four and the number PS of users simultaneously making communication is two, in order to simplify the illustration. In this case, signals supplied from the respective antennas to the receiving part 1R are expressed as follows:

$$RX_1(1) = h_{11} Srx_1(t) + h_{12} Srx_2(t) + n_1(t) \quad (1)$$

$$RX_2(1) = h_{21} Srx_1(t) + h_{22} Srx_2(t) + n_2(t) \quad (2)$$

$$RX_3(1) = h_{31} Srx_1(t) + h_{32} Srx_2(t) + n_3(t) \quad (3)$$

$$RX_4(1) = h_{41} Srx_1(t) + h_{42} Srx_2(t) + n_4(t) \quad (4)$$

where $RX_j(1)$ represents the signal received in the j-th (j=1, 2, 3, 4) antenna, and $Srx_i(t)$ represents the signal transmitted from the i-th (i=1, 2) user.

Further, $h_{ji}$ represents the complex coefficient of the signal transmitted from the i-th user and received in the j-th antenna, and $n_j(t)$ represents noise included in the j-th received signal.

The above equations (1) to (4) are expressed in a vector form as follows:

$$X(t)=H_1 Srx_1(t)+H_2 Srx_2(t)+n_1(t) \quad (5)$$

$$X(t)=[RX_1(t), RX_2(t), \ldots, RX_n(t)]_T \quad (6)$$

$$H_i=[H_{1i}, h_{2i}, \ldots, h_{ni}]^T, (i=1, 2) \quad (7)$$

$$N(t)=[n_1(t), n_2(t), \ldots, n_n(t)]^T \quad (8)$$

In the equations (6) to (8), $[\ldots]^T$ represents inversion of $[\ldots]$.

$X(t)$ represents an input signal vector, $H_i$ represents the coefficient vector of the signal received from the i-th user, and $N(t)$ represents a noise vector respectively.

As shown in FIG. 14, the adaptive array outputs the signal synthesized by multiplying the signals received in the respective antennas by the weight coefficients $w_{1i}$ to $w_{ni}$ as the received signal $S_{RX}(t)$. The number $n$ of the antennas is four.

In order to extract a signal $Srx_1(t)$ transmitted from the first user, for example, under the aforementioned preparation, the adaptive array operates as follows:

An output signal y1(t) from the adaptive array 2100 can be expressed as follows by multiplying the input signal vector $X(t)$ by a weight vector $W_1$:

$$y1(t)=X(t)W_1^T \quad (9)$$

$$W_1=[w_{11}, w_{21}, w_{31}, w_{41}]^T \quad (10)$$

In other words, the weight vector $W_1$ has a weight coefficient $w_{ji}$ (j=1, 2, 3, 4) multiplied by the j-th input signal $RX_1(t)$ as an element.

The input signal vector $X(t)$ expressed in the equation (5) is substituted in the input signal vector y1(t) expressed in the equation (9) as follows:

$$y1(t)=H_1 W_1^T Srx_1(t)+H_2 W_1^T Srx_2(t)+N(t)W_1^T \quad (11)$$

When the adaptive array 2100 ideally operates, the weight vector control part 2011 sequentially controls the weight vector $W_1$ by a known method to satisfy the following simultaneous equations:

$$H_1 W_1^T=1 \quad (12)$$

$$H_2 W_1^T=0 \quad (13)$$

When the weight vector $W_1$ is completely controlled to satisfy the equations (12) and (13), the output signal y1(t) from the adaptive array 2100 is finally expressed as follows:

$$y1(t)=Srx_1(t)+N_1(t) \quad (14)$$

$$N_1(t)=n_1(t)w_{11}+n_2(t)w_{21}+n_3(t)w_{31}+n_4(t)w_{41} \quad (15)$$

In other words, it follows that the signal $Srx_1(t)$ transmitted from the first user in the two users is obtained in the output signal yt(t).

Referring to FIG. 14, the input signal $S_{TX}(t)$ for the adaptive array 2100 is supplied to the transmission part 1T in the adaptive array 2100, to be supplied to the first inputs of the multipliers 2015-1, 2015-2, 2015-3, ..., 2015-n. The weight vectors $w_{1i}, w_{2i}, w_{3i}, \ldots, w_{ni}$ calculated by the weight vector control part 2011 on the basis of the received signals as described above are copied and applied to the second inputs of these multipliers respectively.

The input signals weighted by these multipliers are sent and transmitted to the corresponding antennas #1, #2, #3, ..., #n through the corresponding switches 2010-1, 2010-2, 2010-3, ..., 2010-n.

The users PS1 and PS2 are identified in the following manner. A radio signal from a portable telephone set is transmitted in a frame structure. The radio signal from the portable telephone set is roughly formed by a preamble consisting of a signal series known to the radio base station and data (voice etc.) consisting of a signal series unknown to the radio base station.

The signal series of the preamble includes a signal string of information for identifying whether or not this user is a desired user for making communication with the radio base station. The weight vector control part 2011 of the adaptive array radio base station 1 compares the training signal corresponding to the user A fetched from the memory 2014 with the received signal series and performs weight vector control (decision of a weight coefficient) to extract a signal seeming to include the signal series corresponding to the user PS1.

In general, QPSK modulation or the like which is a modulation system based on PSK modulation is employed as a modulation system applied to transmission/receiving in a portable telephone or the like.

In the PSK modulation, synchronous detection performing detection by integrating a signal synchronous with a carrier on a received signal is generally carried out.

In the synchronous detection, a local oscillator generates a complex conjugate carrier synchronized with the center frequency of a modulated wave. When the synchronous detection is performed, however, frequency errors referred to as frequency offsets are generally present in oscillators on the transmission end and the receiving end. When the received signal is expressed on an IQ plane, the position of the received signal point is rotated on the receiver side due to the errors. Therefore, it is difficult to perform the synchronous detection unless compensating for the frequency offsets.

Such frequency offsets are generated not only by the precision of a local oscillation frequency in the aforementioned transmission/receiving period but also by a set error, temperature fluctuation, time change and the like, and the receiving characteristic is abruptly deteriorated due to a carrier frequency component remaining in the signal input in the receiver.

A technique of providing the so-called "automatic frequency control function (AFC)" in the communication system is known as a method of suppressing such carrier frequency offsets. In such a generally performed automatic frequency control function, however, there is the possibility that a sufficient operation cannot be expected under mobile communication having a transmission condition such as wide band modulation, high-speed phasing, burst signal transmission, multi-path delay distortion, common-frequency interference or the like.

DISCLOSURE OF THE INVENTION

An object of the present invention is to provide a radio unit employed for a base station capable of allocating a common channel to a plurality of users in a common cell by a spatial division multiple access system for compensating for a carrier frequency offset between a terminal and the base station while improving utilization efficiency of the channel.

Briefly stated, the present invention provides a radio unit comprising an array antenna including a plurality of antennas and an adaptive array processing part for receiving signals from the plurality of antennas and extracting a signal from a prescribed terminal, while the adaptive array processing part includes a frequency offset compensation part for compensating for a frequency offset of a received signal in response to a supplied offset compensation quantity, and the radio unit further comprises an offset quantity detection part for receiving an output of the adaptive array processing part and extracting the frequency offset at prescribed timing and an offset compensation quantity operation part updating the offset compensation quantity on the basis of the result of detection by the offset quantity detection part.

Preferably in the radio unit, the received signal is divided into a plurality of slots to be transmitted, each slot includes a first partial signal including a predetermined reference signal and a second partial signal including transmitted data, and the offset quantity detection part includes a first storage part for holding the reference signal, a forced phase-locking part forcibly synchronizing the phase of an output from the adaptive array processing part with a prescribed phase, an error signal generation part outputting the difference between the reference signal stored in the first storage part and the output from the adaptive array processing part in a period when the adaptive array processing part outputs the first partial signal while outputting the difference between an output from the forced phase-locking part and the output from the adaptive array processing part in a period when the adaptive array processing part outputs the second partial signal, and an offset extraction part for extracting the frequency offset on the basis of the output from the error signal generation part.

More preferably in the radio unit, the offset compensation quantity operation part includes a second storage part for storing the offset compensation quantity at any time and a calculation part calculating an update value $\theta'$ for the offset compensation quantity as $\theta'=\theta+\mu\times\Delta\theta$ on the basis of the offset compensation quantity $\theta$ stored in the second storage part and the output $\Delta\theta$ from the offset extraction part assuming that $\mu$ represents a prescribed coefficient.

Or, more preferably in the radio unit, the offset compensation quantity operation part includes a second storage part for storing the offset compensation quantity at any time and a calculation part calculating an update value $\theta'$ for the offset compensation quantity on the basis of the offset compensation quantity $\theta$ stored in the second storage part and the output $\Delta\theta$ from the offset extraction part while reducing the quantity changed in updating as the updating progresses.

Or, more preferably in the radio unit, the offset compensation quantity operation part further includes a second storage part for storing the offset compensation quantity at any time and a calculation part calculating an update value $\theta'$ for the offset compensation quantity on the basis of the offset compensation quantity $\theta$ stored in the second storage part and the output $\Delta\theta$ from the offset extraction part while increasing the quantity changed in updating in response to the magnitude of the absolute value of the output from the error signal generation part.

Or, more preferably in the radio unit, the offset compensation quantity operation part includes a second storage part for storing the offset compensation quantity at any time and a calculation part calculating an update value $\theta'$ for the offset compensation quantity i) on the basis of the offset compensation quantity $\theta$ stored in the second storage part and the output $\Delta\theta$ from the offset extraction part while increasing the quantity changed in updating in response to the magnitude of the absolute value of the output from the error signal generation part in a period when the adaptive array processing part outputs the first partial signal, or ii) as $\theta'=\theta+\mu\times\Delta\theta$ in a period when the adaptive array processing part outputs the second partial signal, assuming that $\mu$ represents a prescribed coefficient.

Preferably, the received signal is divided into a plurality of slots to be transmitted, each slot includes a first partial signal including a predetermined reference signal and a second partial signal including transmitted data, and the offset quantity detection part includes a forced phase-locking part forcibly synchronizing the phase of the output from the adaptive array processing part with a prescribed phase, an error signal generation part outputting the difference between an output from the forced phase-locking part and the output from the adaptive array processing part in a period when the adaptive array processing part outputs the second partial signal and an offset extraction part for extracting the frequency offset on the basis of the output from the error signal generation part.

According to the present invention, therefore, deterioration of a receiving characteristic can be suppressed by controlling the array antenna by adaptive array processing thereby compensating for the frequency offset while allocating a plurality of users to a common channel and improving channel utilization efficiency.

BEST MODES FOR CARRYING OUT THE INVENTION

[First Embodiment]
[Structure of SDMA Base Station 1000]

Figure 1:
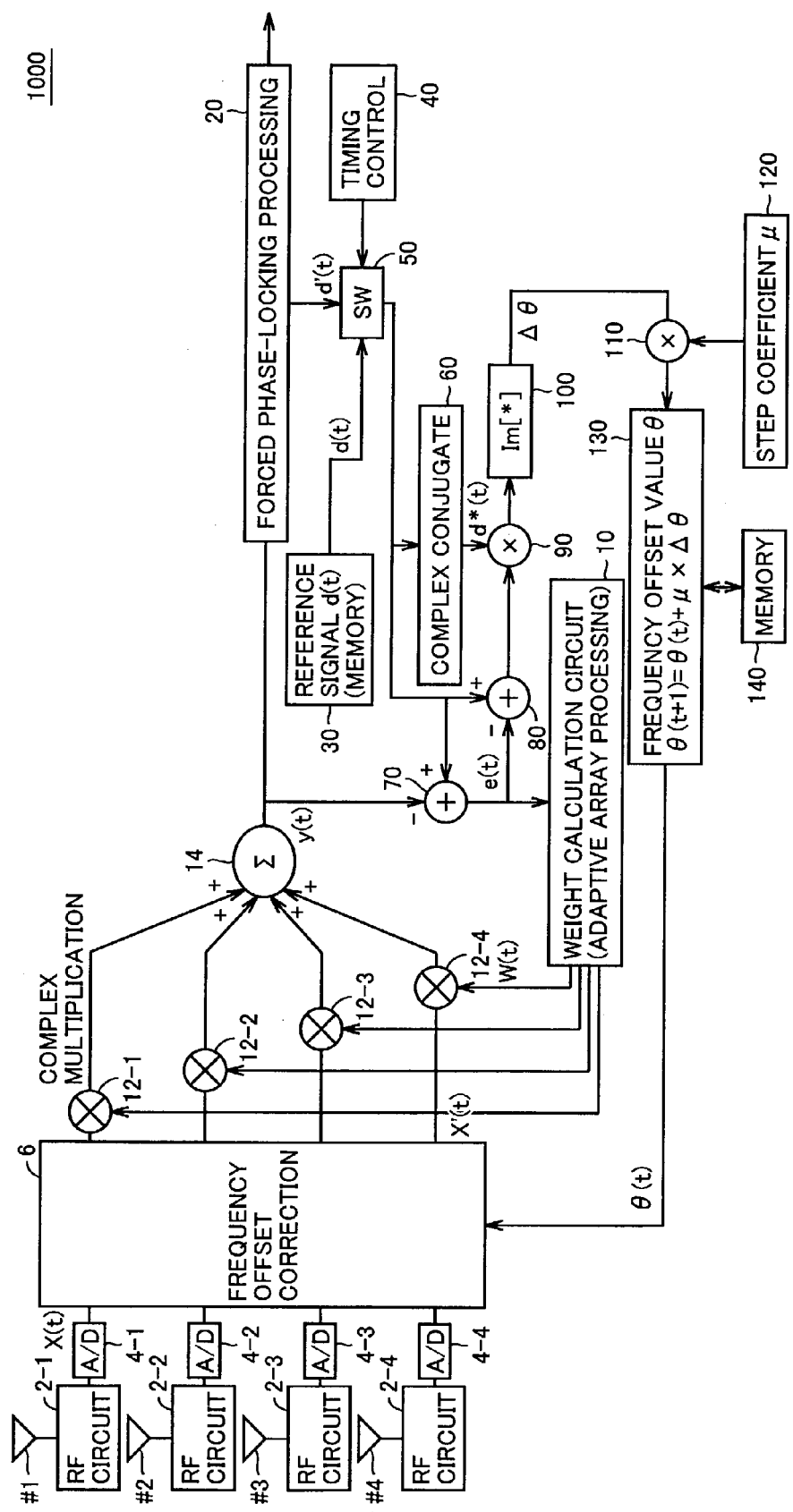
FIG. 1 is a schematic block diagram showing the structure of an SDMA base station 1000 according to a first embodiment of the present invention.

FIG. 1 is a schematic block diagram showing the structure of an SDMA base station 1000 according to a first embodiment of the present invention.

Referring to FIG. 1, the SDMA base station 1000 comprises RF circuits 2-1 to 2-4 receiving signals from an array antenna formed by a plurality of antennas #1 to #4 respectively and down-converting the same and analog-to-digital converters 4-1 to 4-4 for receiving the signals from the RF circuits 2-1 to 2-4 respectively for converting the signals to digital signals and outputting the same as received signal vectors X(t).

While it is assumed in FIG. 1 that four antennas form the array antenna for simplifying the illustration, the number of the antennas may more generally be n (n: natural number of n≧2).

The received signal vectors X(t) are vectors having the signals received from the four antennas as elements.

The SDMA base station 1000 further includes a frequency offset correction part 6 receiving the signals X(t) from the analog-to-digital converters 4-1 to 4-4 and performing complex multiplication on the signals X(t) and a frequency offset correction value θ(t) derived as described later thereby outputting the results as signals X'(t) subjected to correction of frequency offsets, multipliers 12-1 to 12-4 receiving the signals X'(t) output from the frequency offset correction part 6 respectively and multiplying the same by elements of weight vectors W(t) respectively, an adder 14 receiving and adding up outputs from the multipliers 12-1 to 12-4 and outputting the result as a received signal y(t), and a forced phase-locking processing part 20 receiving the output from the adder 14 for forcibly synchronizing the phase of the signal y(t) with a prescribed phase point on an IQ plane.

It is assumed here that the signal y(t) is a signal extracted from a desired terminal among a plurality of terminals, for example, and subjected to QPSK modulation, for example. Therefore, it follows that the forced phase-locking processing part 20 performs processing of forcibly synchronizing the signal subjected to QPSK modulation with a signal point corresponding to a prescribed phase on the IQ plane.

A signal output from the forced phase-locking processing part 20 is hereinafter referred to as a replica signal d'(t).

The SDMA base station 1000 further comprises a memory 30 previously holding a reference signal included in a preamble among symbols (for example, 120 symbols) included in a signal of one slot and outputting the same as a signal d(t), a timing control part 40 detecting whether a section having the reference signal is received or a section (data part) having no reference signal is received in the received signal of one slot, a switching circuit 50 receiving the replica signal d'(t) from the forced phase-locking processing part and the reference signal d(t) from the memory 30 for outputting either signal under control of the timing control part 40, an adder 70 for adding up the output from the switching circuit 50 and the output from the adder 14 after inverting the signs thereof, and a weight calculation circuit 10 receiving an output from the adder 70 for calculating the weight vectors W(t) by known adaptive array processing.

The SDMA base station 1000 further comprises an adder 80 adding up a signal obtained by inverting the sign of an error signal e(t) output from the adder 70 and the reference signal d(t) or the replica signal d'(t) output from the switching circuit 50, a complex conjugate processing part 60 receiving the output from the switching circuit 50 and outputting a signal d*(t) of a complex conjugate, a multiplier 90 for multiplying the output from the complex conjugate processing part 60 by the output from the adder 80, an offset extraction part 100 receiving an output from the multiplier 90 and extracting the imaginary part thereof thereby extracting a frequency offset Δθ, a step coefficient holding part 120 holding a step coefficient μ for obtaining the offset compensation value, a multiplier 110 multiplying the step coefficient μ output from the step coefficient holding part 120 by the frequency offset quantity Δθ, a memory 140 for storing an update value for the offset compensation quantity, and an offset compensation value calculation part 130 for calculating the offset compensation quantity θ(t) in response to an offset compensation value in precedent processing stored in the memory 140 and an output from the multiplier 110.

In response to an output from the offset compensation value calculation part 130, the frequency offset correction part 6 corrects the frequency offsets in the outputs from the analog-to-digital converters 4-1 to 4-4.

Figure 2:
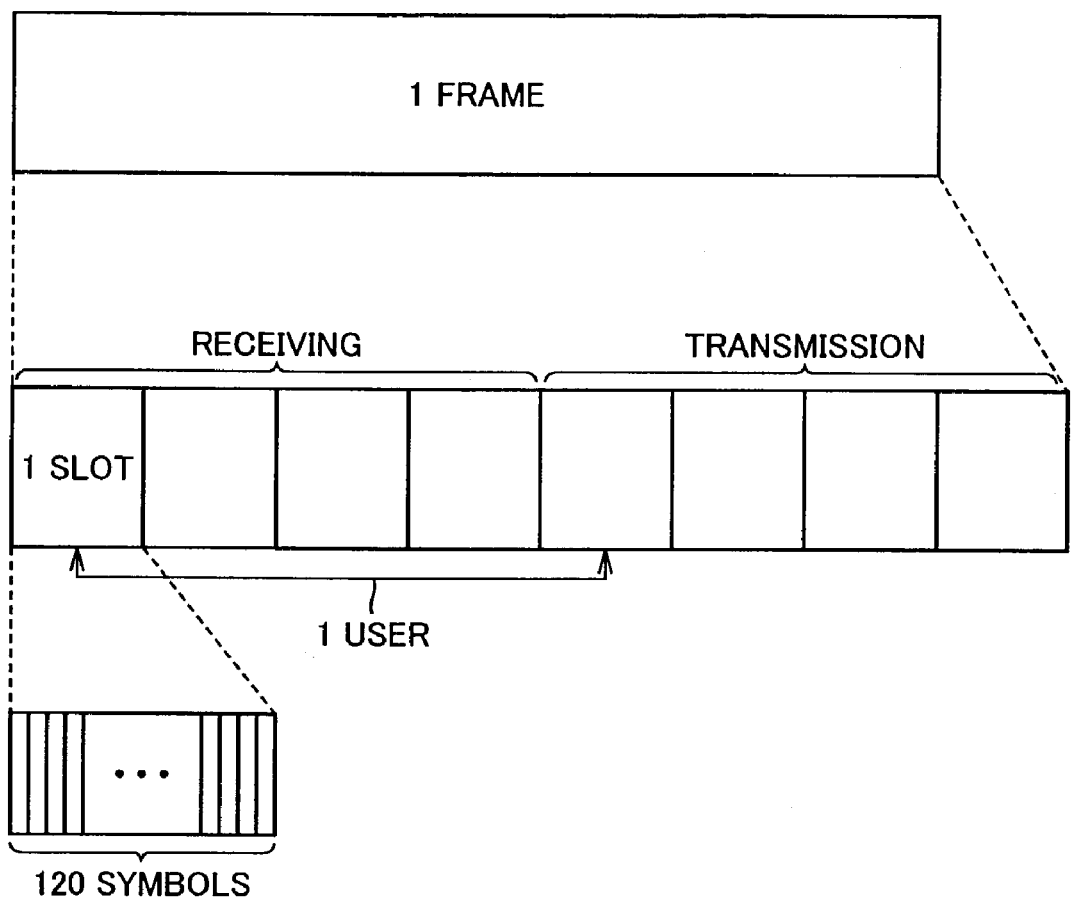
FIG. 2 is a conceptual diagram for illustrating the structure of a signal transferred between a terminal and the SDMA base station 1000.

FIG. 2 is a conceptual diagram for illustrating the structure of a signal transferred between a terminal and the SDMA base station 1000 in the present invention.

A signal of one frame is divided into eight slots, so that the first four slots are employed for receiving, for example, and the rear four slots are employed for transmission, for example.

Each slot is formed by 120 symbols, and the signal of one frame is allocated to four users with a set of a single receiving slot and a single transmission slot in the example shown in FIG. 2.

Figure 3:
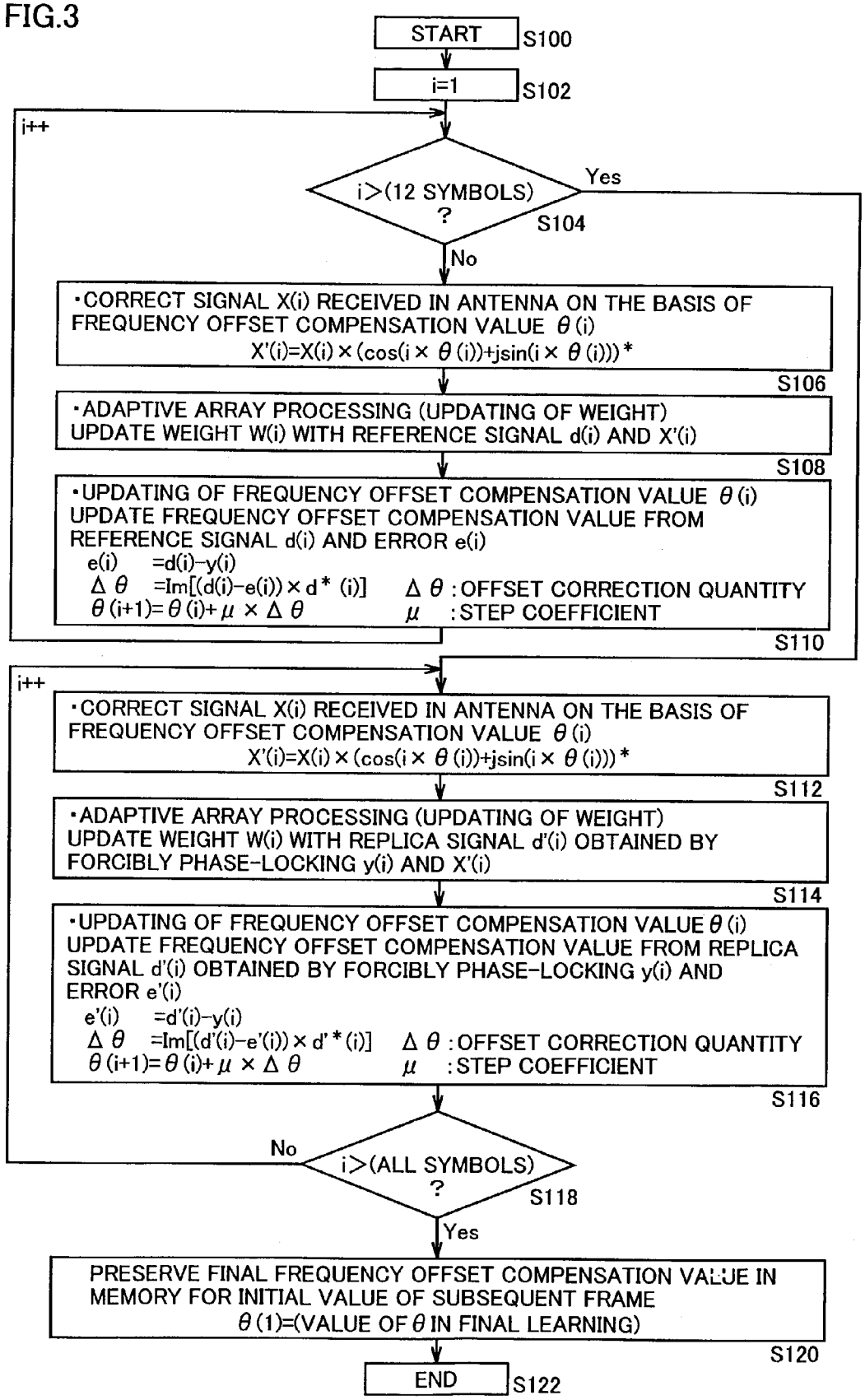
FIG. 3 is a flow chart for illustrating operations of the SDMA base station 1000 shown in FIG. 1.

FIG. 3 is a flow chart for illustrating operations of the SDMA base station 1000 shown in FIG. 1.

Schematically illustrating the processing carried out in FIG. 3, the signals X(t) from the array antennas #1 to #4 are subjected to complex multiplication with the frequency offset compensation value θ(t), and thereafter subjected to adaptive array processing as described with reference to FIG. 1.

The error e(t) is obtained from the output signal y(t) output from the adaptive array and the reference signal d(t) so that the weight calculation circuit 10 performs adaptive array learning on the basis of the error e(t), thereby calculating the weight vector W(t) having the receiving weight corresponding to each antenna as the element.

At this time, a circumferential error of a carrier frequency component on the IQ plane, i.e., the frequency offset value Δθ is extracted from the output signal y(t) from the adaptive array and the reference signal d(t), for calculating the offset compensation value θ(t).

As to processing for updating the frequency offset in the section having the reference signal in the slot of the received signal, the offset compensation value θ(t) is also sequentially updated when the weight vector W(t) is updated from the reference signal d(t) and the received signal vector X(t) by adaptive array learning.

In the section (data part) having no reference signal, the weight vector W(t) and the frequency offset compensation value θ(t) are sequentially updated by adaptive learning no the basis of the replica signal d'(t) obtained by forcibly phase-locking the output y(t) from the adaptive array with the reference signal point and the error in the output of the adaptive array.

As hereinabove described, the SDMA base station 1000 according to the first embodiment performs array learning and offset update processing on all symbols included in one slot. In other words, offset correction of the received signal, array processing and offset compensation value update processing are sequentially performed every symbol. It is assumed that the value of the step coefficient μ employed in offset updating is previously set by an experiment in response to applied environment, for example.

It is also assumed that an offset compensation value θ(1) is set to zero as the initial value of the processing loop.

When applied to a PHS system, for example, the radio unit updates the offset compensation value with the reference signal d(t) stored in the memory 30 between the first and 12$^{th}$ symbols forming a known signal section. For sections having no reference signal following the 13$^{th}$ symbol, the radio unit employs the signal obtained by forcibly phase-locking the array output y(t) with a reference signal point of π/4 QPSK as the replica signal d'(t) of the reference signal for updating the offset compensation value.

In the following description, "t" denotes a variable expressing a time such that t of the offset compensation value θ(t) expresses an elapsed time from a reference point of time, for example, for expressing a quantity corresponding to a symbol number, for example.

Referring to FIG. 3, when receiving is started (step S100), the value of a variable i for counting the symbol number is initialized to 1 (step S102).

Then, whether or not the value of the variable i exceeds 12 is determined (step S104), so that the frequency offset correction part 6 corrects the vector X(i) of the signal received in the antenna on the basis of the frequency offset compensation value θ(i) according to the following equation if the variable i is not more than 12:

$$X'(i) = X(i)e^{-j \times Q(i) \times i}$$
$$= X(i) \times (\cos(i \times Q(i)) + j\sin(i \times Q(i)))^*$$

where j represents an imaginary unit, and Z* represents the complex conjugate of a complex number Z.

Then, the weight calculator 10 calculates and updates the weight vector W(i) with the reference signal d(i) output from the adder 70 and the adaptive array output y(t) obtained from the offset-compensated vector X'(i) of the received signal (step S108).

On the other hand, the adder 80, the complex conjugate processing part 60, the multiplier 90 and the offset extraction part 100 perform processing corresponding to the following operations from the reference signal d(i) output from the switching circuit 50 and the error signal e(i) output from the adder 70, thereby calculating the frequency offset value:

$$e(i)=d(i)-y(i)$$

$$\Delta\theta = \text{Im}[(d(i)-e(i)) \times d^*(i)]$$

In the above equation, Im[ . . . ] represents the imaginary part of [ . . . ].

On the basis of the frequency offset value obtained in the aforementioned manner, the step coefficient holding part 120, the multiplier 110 and the offset compensation value calculation part 130 perform processing for updating the frequency offset compensation value on the basis of the following equation (step S110):

$$\theta(i+1)=\theta(i)+\mu \times \Delta\theta$$

When the processing at the step S110 is ended, the value of the variable i is incremented and the processing returns to the step S104.

When the value of the variable i is determined as exceeding 12 at the step S104, the processing shifts to a step S112. At the step S112, the frequency offset correction part 6 corrects the phase of the received signal vector X(i) and generates the received signal vector X'(i) similarly to the step S106.

Then, the weight calculation circuit 10 updates the weight vector W(i) on the basis of the error signal e(i) obtained by the adder 70 from the adaptive array output y(t) output from the adder 14 and the replica signal d'(i) obtained by forcibly phase-locking the signal y(i) (step S114).

Then, the forced phase-locking processing part 20 outputs the replica signal d'(i) generated by forcibly phase-locking the adaptive array output y(i) through the switching circuit 50, and the adder 70 outputs the error signal e'(i). On the basis of a result obtained by multiplying a result of adding a signal obtained by inverting the sign of the signal e'(i) and the replica signal d'(i) in the adder 80 by the signal d*(i) output from the complex conjugate processing part 60 in the multiplier 90, the offset extraction part 100 calculates the frequency offset Δθ on the basis of the following equations:

$$e'(i)=d'(i)-y(i)$$

$$\Delta\theta = \text{Im}[(d'(i)-e'(i)) \times d'^*(i)]$$

On the basis of the frequency offset quantity Δθ, the offset compensation value calculation part 130 updates the offset compensation quantity according to the following equation, for storing the updated offset compensation quantity in the memory 140 and supplying the same to the frequency offset correction part 6:

$$\theta(i+1)=\theta(i)+\mu \times \Delta\theta$$

Then, whether or not the variable i is larger than the number (e.g., 120) of all symbols is determined (step S118) so that the processing returns to the step S112 if the variable i is not more than the number of all symbols while the processing shifts to a step S120 if the variable i is in excess of the number of all symbols.

Then, the final frequency offset value is preserved in the memory 140 for the initial value of the subsequent frame. Thus, it follows that the initial value θ(1) of the offset compensation quantity for the subsequent frame is set as follows (step S120):

$$\theta(1)=(\text{value of } \theta \text{ in final learning})$$

The processing for one slot is ended by the aforementioned processing (step S122).

The frequency offset of the received signal is compensated for due to the aforementioned processing, whereby the radio unit employing the adaptive array can attain a stable receiving characteristic.

[Second Embodiment]

Figure 4:
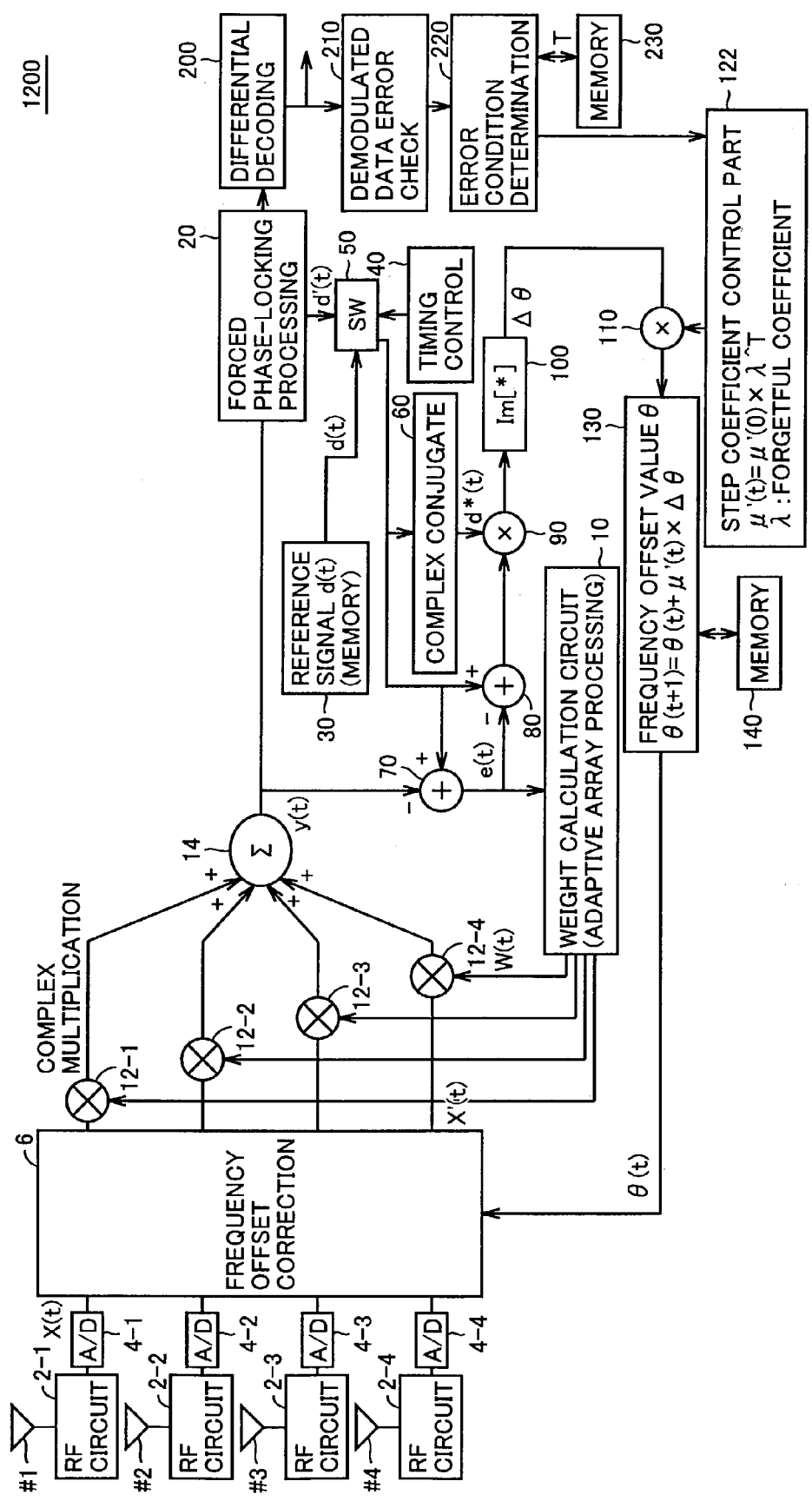
FIG. 4 is a schematic block diagram for illustrating the structure of an SDMA base station 1200 according to a second embodiment of the present invention.

FIG. 4 is a schematic block diagram for illustrating the structure of an SDMA base station 1200 according to a second embodiment of the present invention, in contrast with FIG. 1 showing the first embodiment.

The structure of the SDMA base station 1200 according to the second embodiment is different from the structure of the SDMA base station 1000 according to the first embodiment in the following points:

The SDMA base station 1200 further comprises a demodulation error data check part 210 detecting whether or not decoded data includes receiving errors in response to an output from a differential decoding processing part 200 (not shown in FIG. 1) performing code processing on the basis of an output from a forced phase-locking processing part 20, an error condition determination processing part 220 responsively determining an error condition when a result of error detection is supplied from the demodulation error data check part and a memory 230 for storing the number T of times of such error determinations.

In the SDMA base station 1200, further, a step coefficient control part 122 is provided in place of the step coefficient holding part 120, for changing a step coefficient employed for obtaining an offset compensation value in response to the number T of error times supplied from the error condition determination processing part 220 on the basis of the following equation:

$$\mu'(t)=\mu'(0)\times\lambda^T$$

where $\lambda$ represents a constant satisfying $0<\lambda<1$, and is hereinafter referred to as a forgetful coefficient. Further, $\mu'(0)$ represents an initial value.

According to the aforementioned structure, the value of the step coefficient $\mu$ is gradually reduced as a learning section progresses.

A true frequency offset value does not change in a short time, and hence it is conceivable that a value correct to some extent is required when the offset value shifts to a convergence stage.

When a large error abruptly appears due to noise or an error, it follows that the offset value recedes from the true value on the basis of the error if learning similar to that heretofore performed is carried out. In other words, it follows that the offset value makes transition with a swing width due to influence by disturbance or the like also after convergence.

As hereinabove described, the error condition determination processing part 220 determines whether or not the caused error is based on abrupt noise or the like with reference to a learning history or the like, thereby reducing the step coefficient which is an update width for the offset compensation value after considering that the offset value has entered a convergence stage. Thus, it is possible to prevent the offset compensation value from remarkably fluctuating by an error resulting from abrupt noise or the like for more correctly estimating the offset value.

Figure 5:
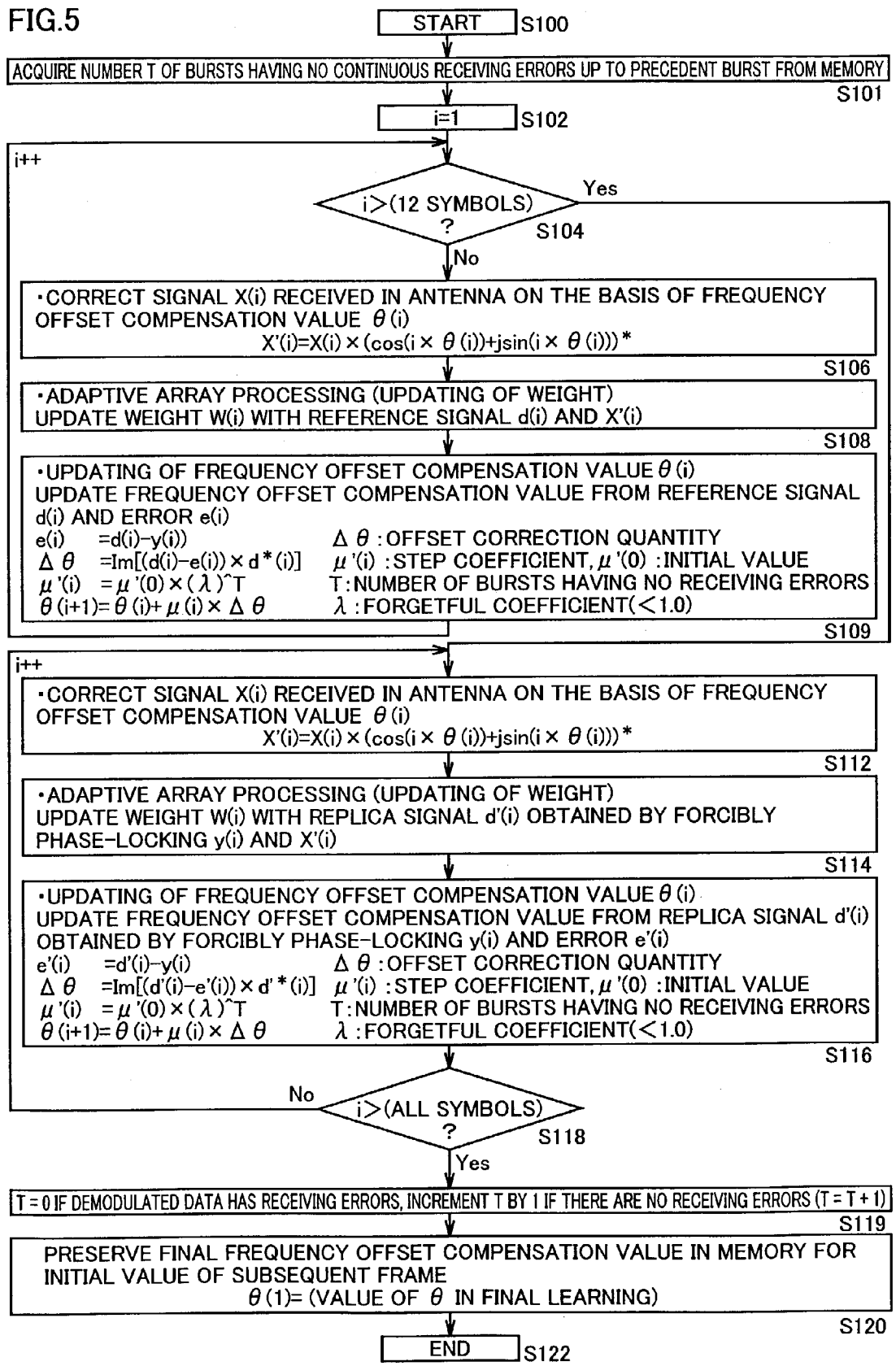
FIG. 5 is a flow chart for illustrating operations of the SDMA base station 1200 according to the second embodiment.

FIG. 5 is a flow chart for illustrating operations of the SDMA base station 1200 according to the second embodiment shown in FIG. 4, in contrast with FIG. 3.

Referring to FIG. 5, when receiving processing is started (step S100), the value of a variable i for counting a symbol number is initialized to 1 (step S102).

Then, whether or not the value of the variable i is in excess of 12 is determined (step S104), so that a frequency offset correction part 6 corrects a vector X(i) of a signal received in an antenna on the basis of a frequency offset compensation value θ(i) if the variable i is not more than 12 (step S106).

Then, a weight calculator 10 calculates and updates a weight vector W(i) with a reference signal d(i) output from an adder 70 and an adaptive array output y(t) obtained from an offset-compensated received signal vector X'(i) (step S108).

On the other hand, an adder 80, a complex conjugate processing part 60, a multiplier 90 and an offset extraction part 100 perform processing corresponding to the following operations from the reference signal d(i) output from a switching circuit 50 and an error signal e(i) output from the adder 70 thereby calculating the frequency offset value:

$$e(i)=d(i)-y(i)$$

$$\Delta\theta=\text{Im}[(d(i)-e(i))\times d^*(i)]$$

In the above equation, Im[ . . . ] represents the imaginary part of [ . . . ].

On the basis of the frequency offset value obtained in the aforementioned manner, a step coefficient holding part 120, a multiplier 110 and an offset compensation value calculation part 130 perform processing for updating the frequency offset compensation value on the basis of the following equations (step S109):

$$\mu'(i)=\mu'(0)\times\lambda^T$$

$$\theta(i+1)=\theta(i)+\mu'(i)\times\Delta\theta$$

When the processing at the step S109 is ended, the value of the variable i is incremented and the processing returns to the step S104.

When the value of the variable i is determined as exceeding 12 at the step S104, the processing shifts to a step S112. At the step S112, the frequency offset correction part 6 corrects the phase of the received signal vector X(i) similarly to the step S106, for generating a received signal vector X'(i).

Then, the weight calculation circuit 10 updates the weight vector W(i) on the basis of the error signal e(i) obtained by the adder 70 on the basis of the adaptive array output y(t) output from the adder 14 and a replica signal d'(i) obtained by forcibly phase-locking the signal y(i) (step S114).

Then, a forced phase-locking processing part outputs the replica signal d'(i) generated by forcibly phase-locking the adaptive array output y(i) through a switching circuit 50, and the adder 70 outputs an error signal e'(i). On the basis of a result obtained multiplying a result of adding a signal obtained by inverting the sign of the signal e'(i) and the replica signal d'(i) in the adder 80 by a signal d*(i) output from the complex conjugate processing part 60 in a multiplier 90, the offset extraction part 100 calculates a frequency offset quantity Δθ on the basis of the following equations:

$$e'(i)=d'(i)-y(i)$$

$$\Delta\theta=\text{Im}[(d(i)-e(i))\times d^*(i)]$$

On the basis of the frequency offset quantity Δθ, further, th offset compensation calculation part 130 updates the offset compensation quantity according to the following equations for storing the offset compensation quantity in a memory 140 and supplying the same to the frequency offset correction part 6 (step S115):

$$\mu'(i)=\mu'(0)\times\lambda^T$$

$$\theta(i+1)=\theta(i)+\mu'(i)\times\Delta\theta$$

Then, whether or not the variable i is larger than the number (e.g., 120) of all symbols is determined (step S118) so that the processing returns to the step S112 if the variable i is not more than the number of all symbols while the processing shifts to a step S119 if the variable i is in excess of the number of all symbols.

A number T of frames having no continuous receiving errors is set to zero if demodulated data includes a receiving error, while the number T of frames having no continuous receiving errors is incremented by 1 and stored in a memory 230 if there is no receiving error (step S119).

Then, the final frequency offset value is preserved in the memory 140 for the initial value of the subsequent frame. Thus, it follows that the initial value θ(1) of the offset compensation quantity for the subsequent frame is set as follows (step S120):

θ(1)=(value of θ in final learning)

Processing for one slot is ended by the aforementioned processing (step S122).

The frequency offset of the received signal is compensated for by performing the aforementioned processing, whereby a radio unit employing an adaptive array can attain a stable receiving characteristic.

Further, the frequency offset quantity can be more stably compensated for without being influenced by abrupt external fluctuation, as described above.

[First Modification of Second Embodiment]

In the second embodiment, the value of the step coefficient μ is gradually reduced as the learning section progresses. While the value of the step coefficient μ changes on the basis of the number T of frames allowing no detection of continuous receiving errors after receiving is started, it is also possible to reduce the value of the step coefficient μ in response to the number of symbols having no continuous receiving errors or the number of all frames from starting of receiving, for example.

[Second Modification of Second Embodiment]

It is also possible to perform offset estimation processing itself only in a first frame for starting receiving during single speech communication processing while performing no processing as to subsequent frames. When a receiving error takes place, offset estimation is performed again.

[Third Modification of Second Embodiment]

Alternatively, it is also possible not to perform offset compensation quantity update processing every frame but to perform the processing once every 10 frames, for example.

[Fourth Modification of Second Embodiment]

Further, it is also possible to perform processing of returning the step coefficient μ'(t) or the offset compensation quantity θ(t) to the initial value when an error takes place.

The compensation processing for the offset value is quickly completed by returning the offset update value (the value of the step coefficient μ) to the initial numerical value (or gradually increasing the value of the step coefficient μ'(t)) when a certain condition holds while performing the aforementioned offset compensation processing.

The aforementioned certain condition indicates such a case that errors take place continuously over 100 frames, an error ratio of at least 20% is detected, or interference avoidance activation takes place, for example.

When the value T is set for the number of frames having no continuous receiving errors in the second embodiment, the value T reaches zero if an error takes place, and hence it follows that the step coefficient μ'(t) returns to the initial value μ'(0).

[Fifth Modification of Second Embodiment]

Further, the minimum value of the step coefficient μ(t) can also be previously set.

If the value of the step coefficient μ'(t) is excessively reduced, updating of the offset compensation value itself loses the effect.

Therefore, the minimum value of the step coefficient μ'(t) is previously set. For example, a possibility of limiting the maximum for the value T to 1000 or the like is conceivable.

It is assumed that the minimum value of the step coefficient μ'(t) is set on the basis of operation accuracy or CNR.

Offset value compensation more stable than that in the embodiment is enabled due to the aforementioned structure.

[Third Embodiment]

Figure 6:
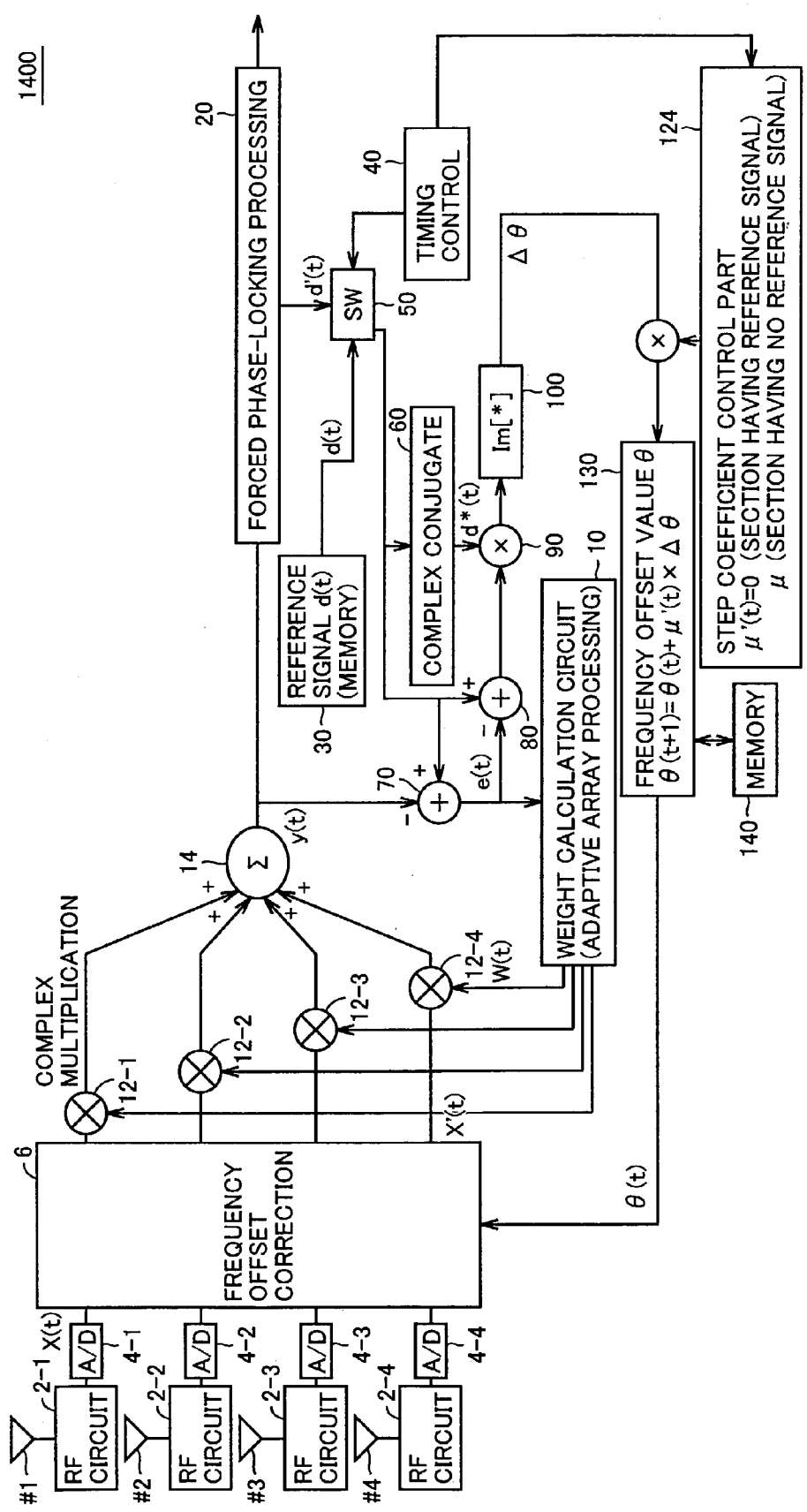
FIG. 6 is a schematic block diagram for illustrating the structure of an SDMA base station 1400 according to a third embodiment of the present invention.

FIG. 6 is a schematic block diagram for illustrating the structure of an SDMA base station 1400 according to a third embodiment of the present invention.

The structure shown in FIG. 6 is different from the structure of the SDMA base station 1000 according to the first embodiment shown in FIG. 1 in a point that a step coefficient control part 124 controlled by a timing control part 40 is provided in place of the step coefficient holding part 120.

The remaining structure of the SDMA base station 1400 is similar to the structure of the SDMA base station 1000 according to the first embodiment shown in FIG. 1, and hence common parts are denoted by the same reference numerals, and redundant description is not repeated.

The step coefficient control part 124 sets the value of a step coefficient μ'(t) to zero in a section having a reference signal, while setting the same to a prescribed value μ in a section having a reference signal.

The above processing is performed for the following reason:

In an initial stage (initial symbol stage) of array learning, there is a possibility that a weight vector output from a weight calculation circuit 10 is not converged to a correct value. In this case, an error between the reference signal and an array output exhibits a large value, and it follows that an offset value is remarkably updated.

In such a stage that the weight vector is not converged, there is a possibility that it is difficult to precisely determine the offset value.

In order to more precisely estimate the offset value, therefore, updating of the offset value is stopped in a stage where learning (weight value or error) of an adaptive array is not converged.

Figure 7:
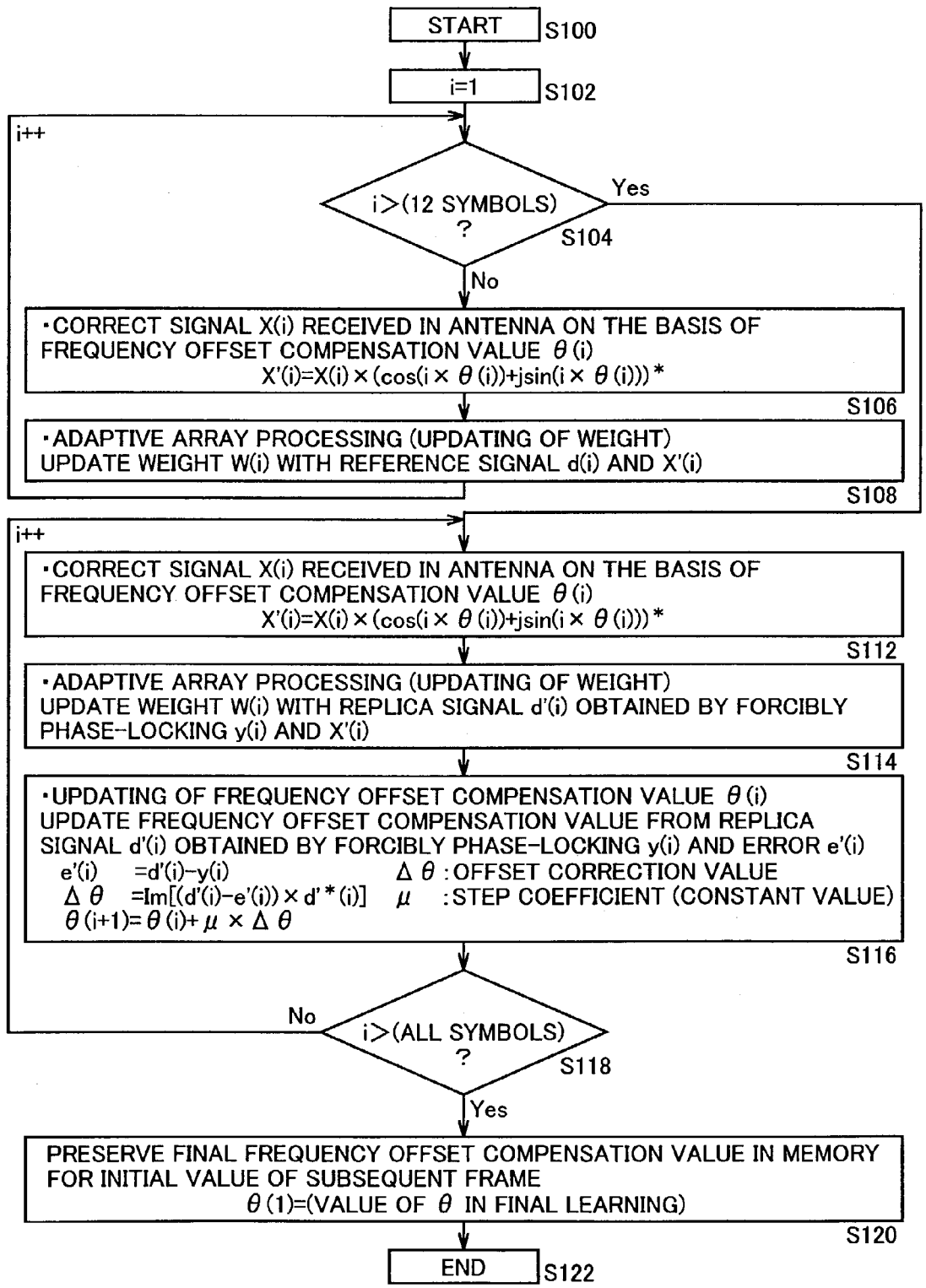
FIG. 7 is a flow chart for illustrating operations of the SDMA base station according to the third embodiment.

FIG. 7 is a flow chart for illustrating operations of the SDMA base station according to the third embodiment shown in FIG. 6.

The processing shown in FIG. 7 is similar to the processing of the first embodiment shown in FIG. 3 except that an offset compensation value is not updated in a period when an adder 14 outputs a received signal y(t) including the reference signal, i.e., while a variable i is not more than 12, and hence processing corresponding to the step S110 is omitted, and hence redundant description is not repeated.

According to such processing, it is possible to precisely determine the offset value for performing stable offset compensation processing.

[Fourth Embodiment]

Figure 8:
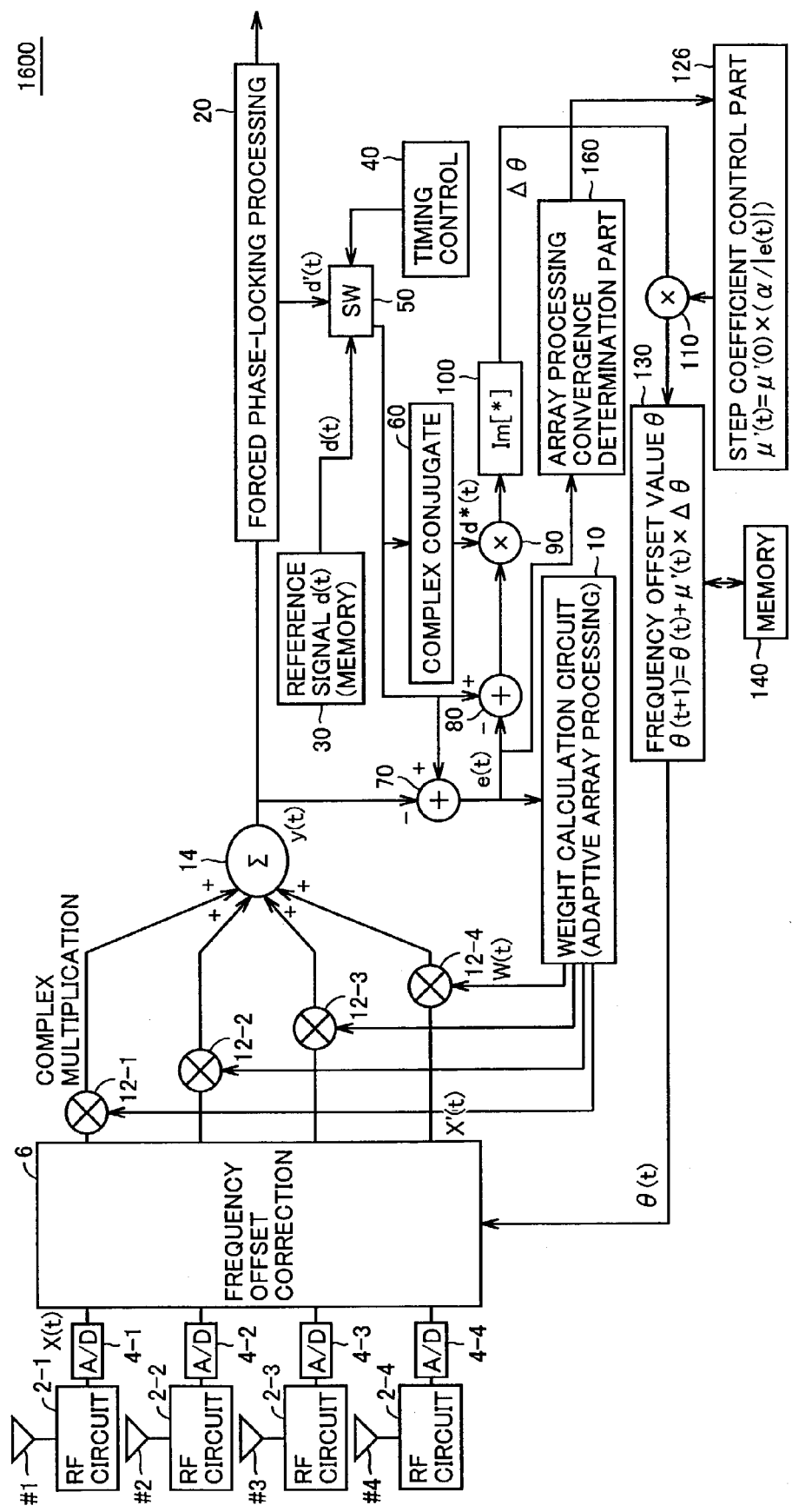
FIG. 8 is a schematic block diagram for illustrating the structure of an SDMA base station 1600 according to a fourth embodiment of the present invention.

FIG. 8 is a schematic block diagram for illustrating the structure of an SDMA base station 1600 according to a fourth embodiment of the present invention.

The structure shown in FIG. 8 is different from the structure of the SDMA base station 1000 according to the first embodiment shown in FIG. 1 in the following point:

Referring to FIG. 8, the SDMA base station 1600 according to the fourth embodiment is provided with an array processing convergence determination part 160 determining whether or not array processing is converged on the basis of an error signal e(t) output from an adder 70 and a step coefficient control part 126 controlled on the basis of the result of determination of the array processing convergence determination part 160 for changing the value of a step coefficient μ'(t) in place of the step coefficient holding part 120.

The remaining structure of the SDMA base station 1600 is similar to the structure of the SDMA base station 1000 shown in FIG. 1, and hence common parts are denoted by the same reference numerals, and redundant description is not repeated.

The step coefficient control part 126 changes the value of the step coefficient μ'(t) on the basis of the following equation:

$$\mu'(t)=\mu'(0)\times(\alpha/|e(i)|)$$

where α represents a constant number, and hence the value of an offset update speed (step coefficient) is reduced if an error is large, while the offset update speed is increased i the error is small.

Figure 9:
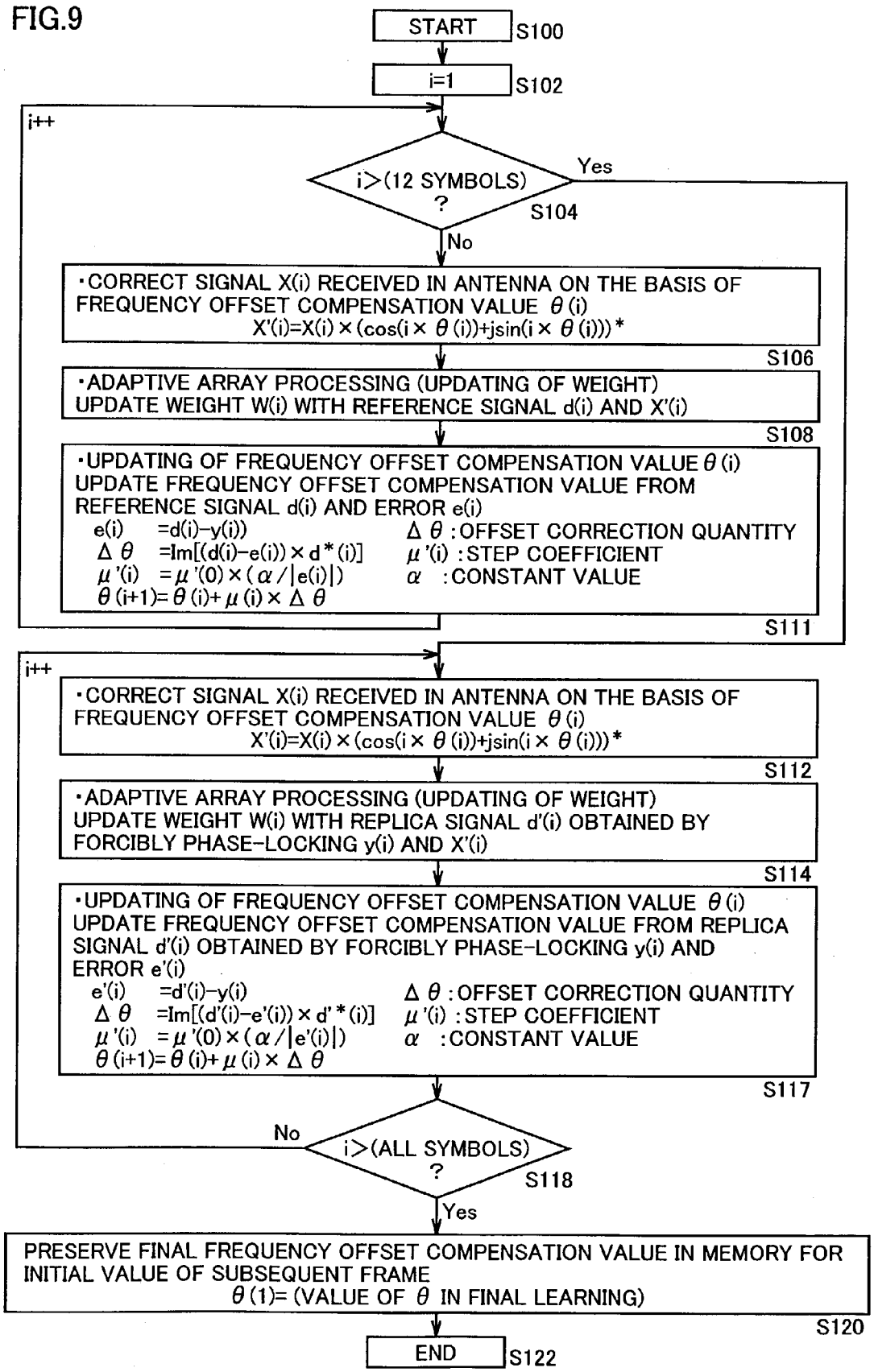
FIG. 9 is a flow chart for illustrating operations of the SDMA base station 1600 according to the fourth embodiment.

FIG. 9 is a flow chart for illustrating operations of the SDMA base station 1600 according to the fourth embodiment shown in FIG. 8.

The processing shown in FIG. 9 is similar to the processing of the first embodiment shown in FIG. 3 except that the step coefficient for updating the offset compensation quantity is changed in the aforementioned manner in a step S111 corresponding to the step S110 and a step S117 corresponding to the step S116, and hence redundant description is not repeated.

As a method of changing the step coefficient μ'(t), change based on the following equation is also conceivable:

$$\mu'(t)=\mu'(0)\times(\alpha/|\log|e(i)||)$$

According to the aforementioned processing, updating of the offset compensation value is suppressed in a period when a weight vector is not converged to a correct value in an initial stage of array learning or the like and it is possible to reduce the time up to convergence of the offset value. When an error e(i) is larger than a constant value and it is estimated that precision of a weight is excellent, the step coefficient μ'(t) is not remarkably changed but limited to a constant value.

[Modification of Fourth Embodiment]

It is also possible to control an offset update speed on the basis of transition of a receiving response vector value in array learning.

In other words, processing of calculating transition (correlation value) between receiving response vectors in a precedent frame and a current frame in update processing for increasing the offset update speed if the value is close to 1. On the other hand, the offset update speed is reduced if the value is small.

In other words, the offset value is updated on the basis of the following equation:

$$\mu'(t)=\mu'(0)\times(\beta \times COR)$$

where COR represents the correlation value between the receiving response vectors of the precedent frame and the current frame, and β represents a constant coefficient.

[Fifth Embodiment]

Figure 10:
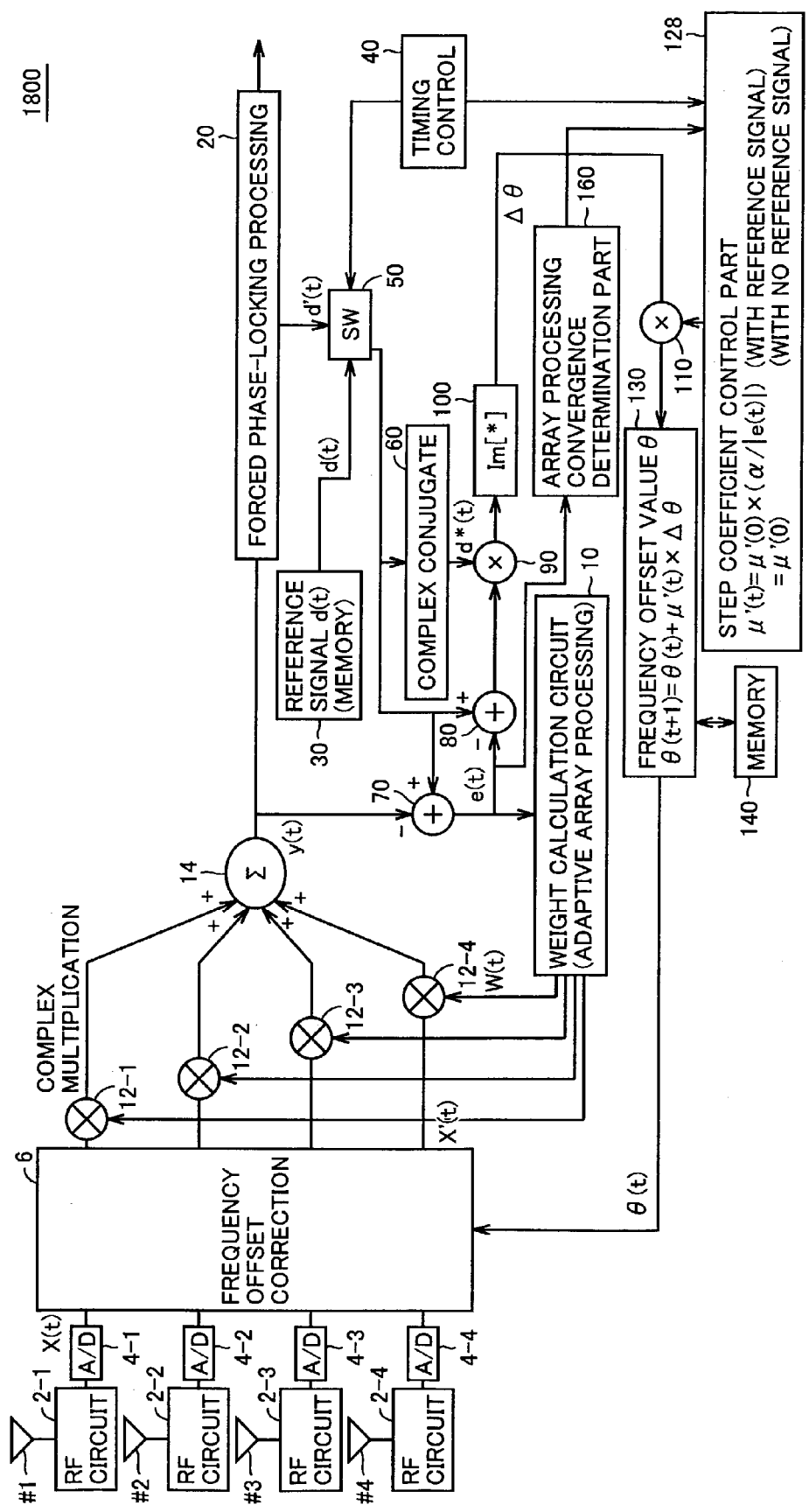
FIG. 10 is a schematic block diagram for illustrating the structure of an SDMA base station 1800 according to a fifth embodiment of the present invention.

FIG. 10 is a schematic block diagram for illustrating the structure of an SDMA base station 1800 according to a fifth embodiment of the present invention.

The structure of the SDMA base station 1800 according to the fifth embodiment is different from the structure of the SDMA base station 1000 according to the first embodiment shown in FIG. 1 in the following point:

The SDMA base station 1800 according to the fifth embodiment is provided with an array processing convergence determination part 160 for detecting whether or not adaptive array processing is in a convergence stage in response to an error signal e(t) output from an adder 70 and a step coefficient control part 128 controlled by the result of determination of the array processing convergence determination part 160 and a timing signal from a timing control part 40 for changing the value of a step coefficient μ'(t) in place of the step coefficient holding part 120.

The remaining structure of the SDMA base station 1800 is similar to the structure of the SDMA base station 1000 according to the first embodiment shown in FIG. 1, and hence common parts are denoted by the same reference numerals, and redundant description is not repeated.

In the structure of the SDMA base station 1800 according to the fifth embodiment, the step coefficient control part 128 performs the following processing:

Under control of the timing control part 40, the step coefficient control part 128 changes the step coefficient μ'(t) in a section having a reference signal according to the following equation, similarly to the fourth embodiment:

$$\mu'(t)=\mu'(0)\times(\alpha/|e(i)|)$$

$$(\text{or } \mu'(t)=\mu'(0)\times(\alpha/|\log|e(i)||))$$

In a section having no reference signal, the step coefficient control part 128 sets the step coefficient μ'(t) to an initial value μ'(t).

According to the aforementioned processing, an error signal e(i) is reduced below a constant value in the section having the reference signal when array processing is quickly converged, while an offset update speed is gradually increased if it is estimable that array processing is converged. It is assumed that constant threshold limitation is provided not to excessively increase the offset update speed.

When reaching the section having no reference signal in addition, the offset update speed is returned to an initially set value, to reach a constant value. Thus, it follows that the update speed is limited.

Figure 11:
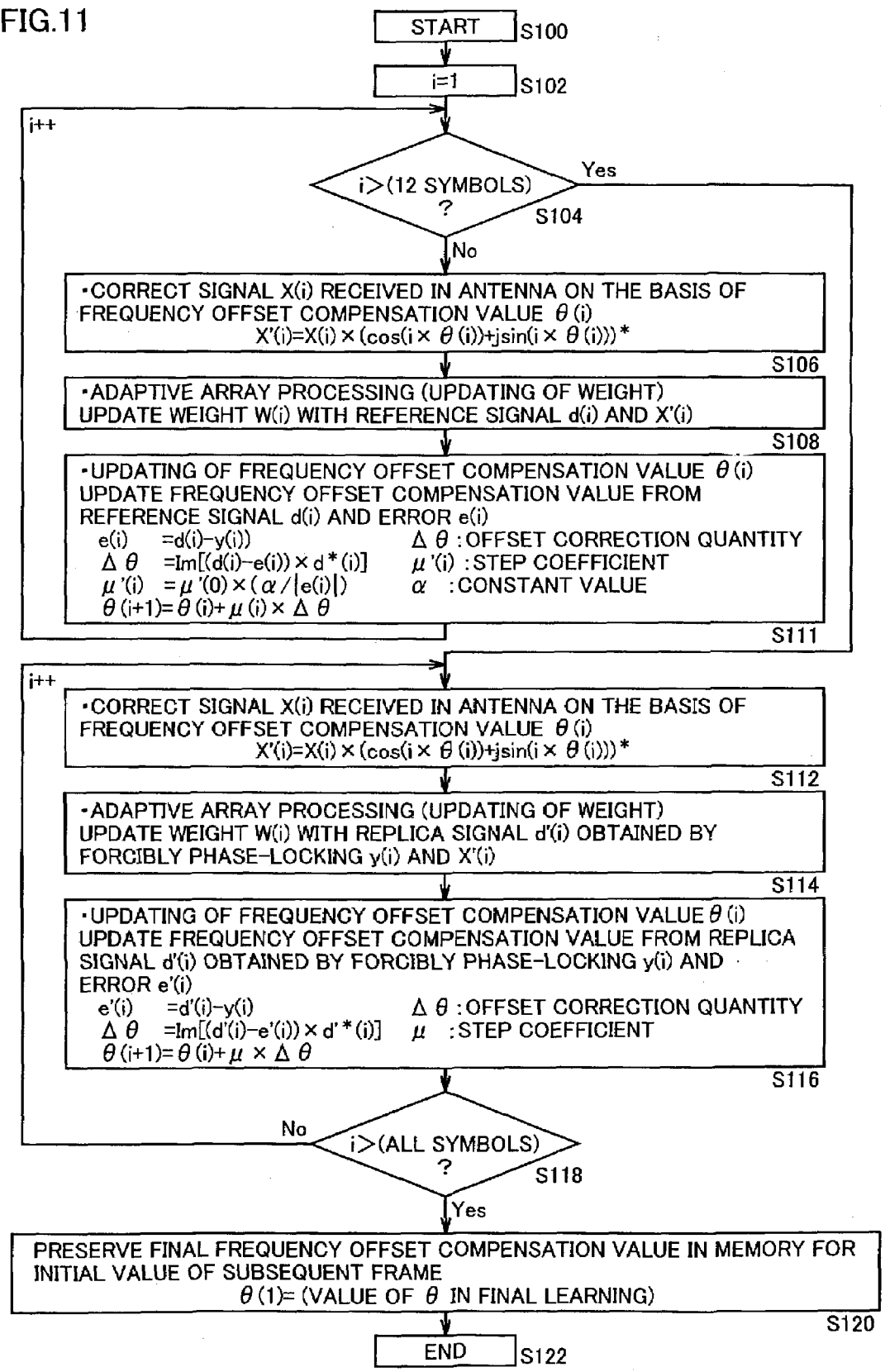
FIG. 11 is a flow chart for illustrating operations of the SDMA base station 1800 according to the fourth embodiment.
Figure 12:
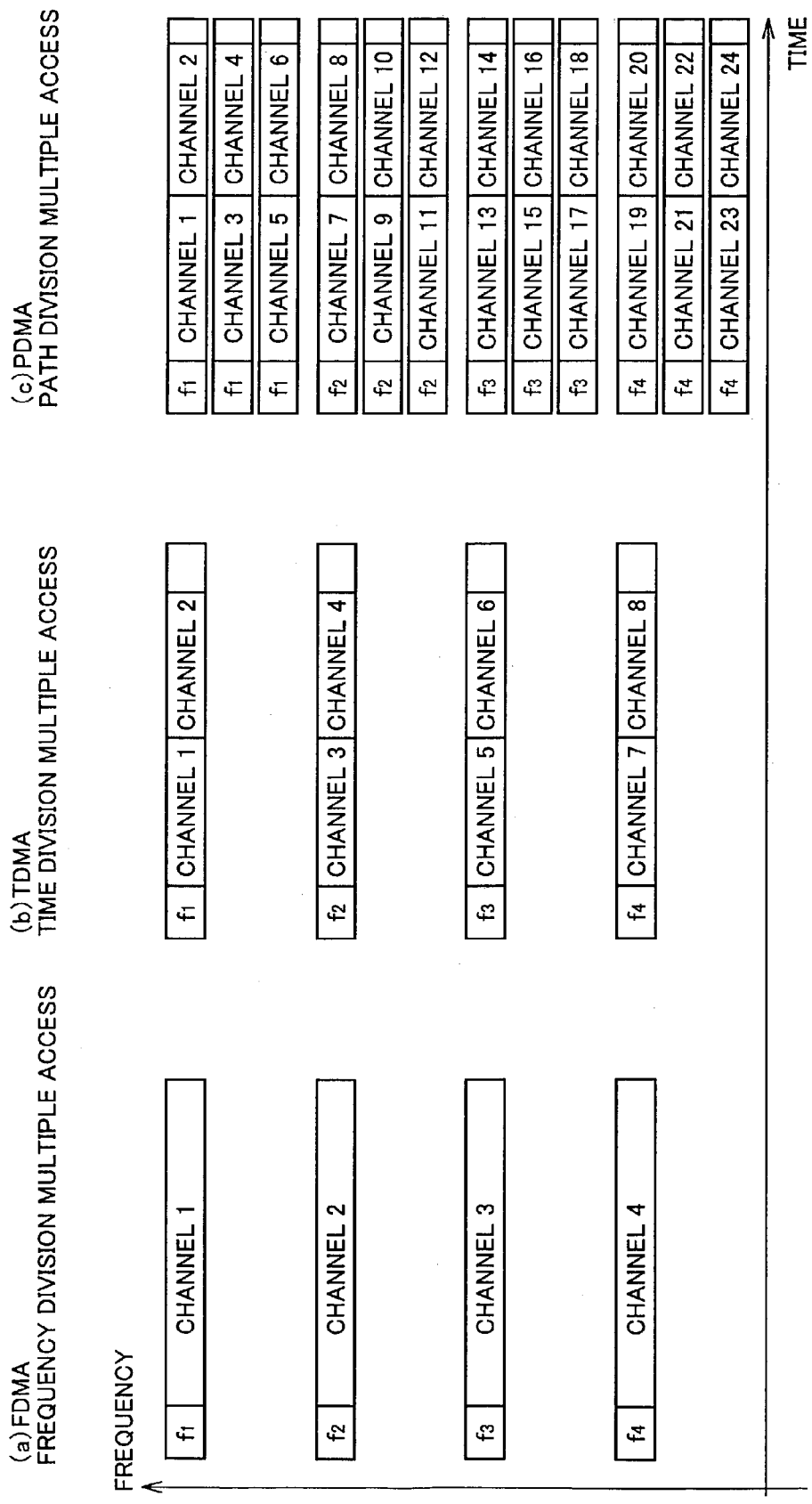
FIGS. 12(a) to 12(c) illustrate arrangements of channels in various types of communication systems, i.e., a frequency division multiple access system, a time division multiple access system and a spatial division multiple access system.
Figure 13:
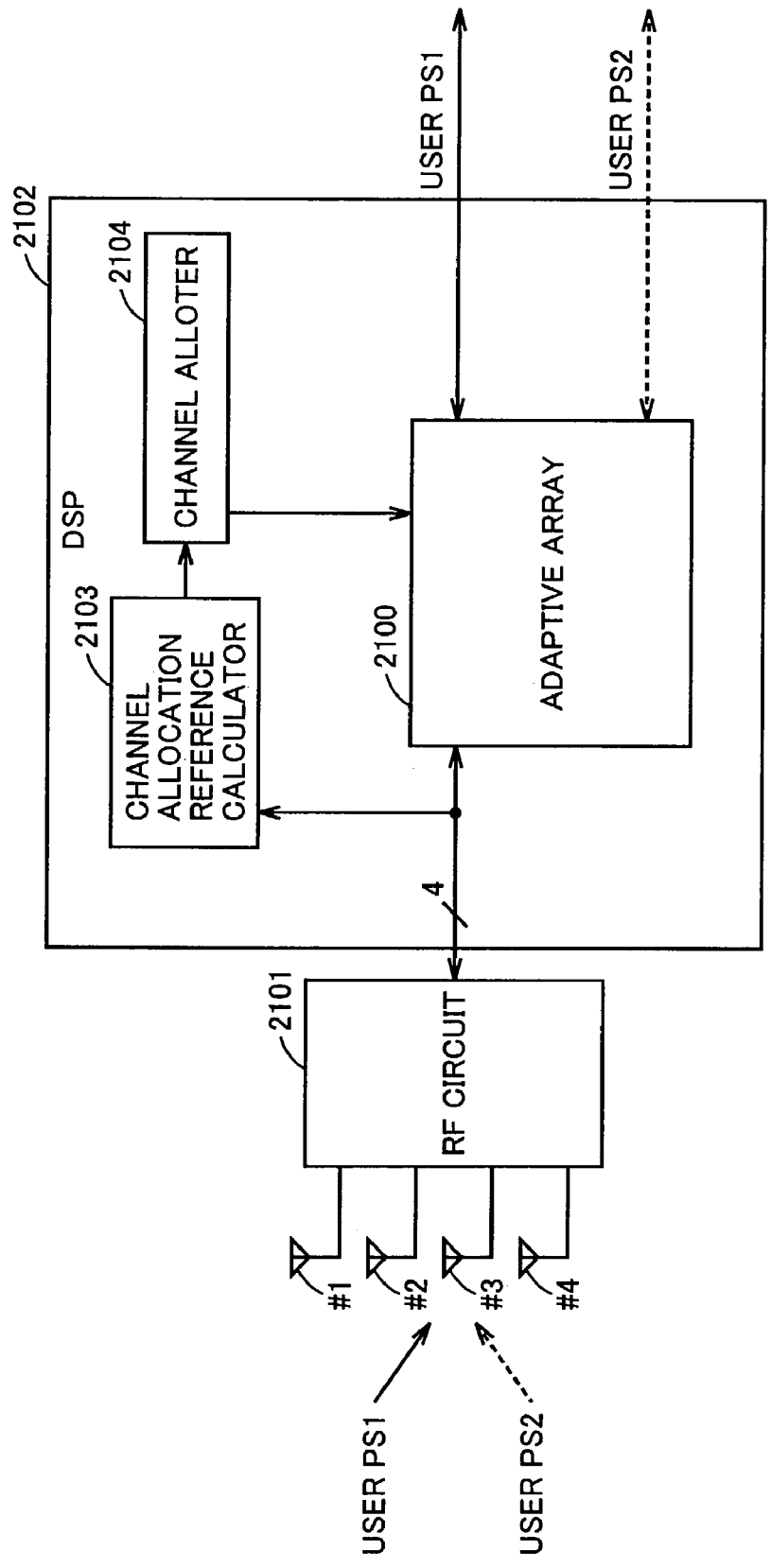
FIG. 13 is a schematic block diagram showing the structure of a transmission/receiving system 2000 of a conventional SDMA base station.
Figure 14:
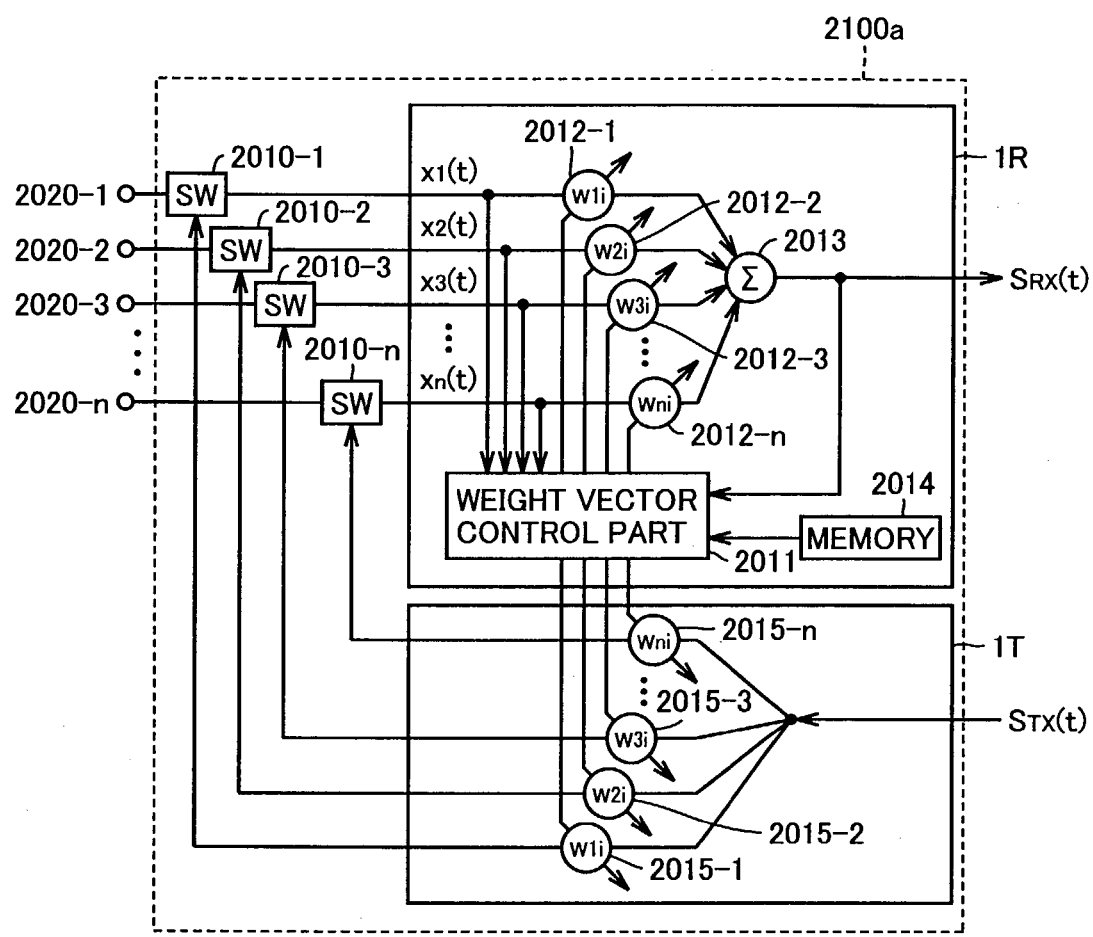
FIG. 14 is a block diagram showing the structure of a transmission/receiving part 2100a corresponding to a single user in an adaptive array 2100.

FIG. 11 is a flow chart for illustrating operations of the SDMA base station 1800 according to the fifth embodiment shown in FIG. 10.

The processing shown in FIG. 11 is similar to the processing according to the first embodiment shown in FIG. 3 except that the step coefficient for updating an offset compensation quantity is changed as described above in a step S111 corresponding to the step S110, and hence redundant description is not repeated.

Therefore, a larger number of offset updating opportunities is supplied as compared with the third embodiment, whereby convergence is quickly made. In addition, while the offset update speed is so excessively increased that there is a possibility for divergence overflow of the variable if errors are reduced in the fourth embodiment, it is possible to advantageously avoid this.

It follows that offset updating is performed after array processing is converged due to the aforementioned processing, whereby offset estimation precision is improved and convergence of the offset compensation value can be quickly performed.

The embodiments disclosed this time must be considered illustrative in all points and not restrictive. The scope of the present invention is shown not by the above description but by the scope of claim for patent, and it is intended that all modifications within the meaning and range equivalent to the scope of claim for patent are included.

The invention claimed is:

1. A radio unit comprising:
an array antenna including a plurality of antennas; and
adaptive array processing means for receiving signals from said plurality of antennas and extracting a signal from a prescribed terminal, wherein
said adaptive array processing means includes frequency offset compensation means for compensating for a frequency offset of a received signal in response to a supplied offset compensation quantity,
said radio unit further comprising:
offset quantity detection means for receiving an output of said adaptive array processing means and extracting the frequency offset at prescribed timing; and
offset compensation quantity operation means for sequentially updating said offset compensation quantity for each symbol in a time slot on the basis of the result of detection by said offset quantity detection means.

2. The radio unit according to claim 1, wherein
said received signal is divided into a plurality of slots to be transmitted,
each said slot includes:
a first partial signal including a predetermined reference signal, and
a second partial signal including transmitted data, and
said offset quantity detection means includes:
first storage means for holding said reference signal,
forced phase-locking means forcibly synchronizing the phase of an output from said adaptive array processing means with a prescribed phase,
error signal generation means outputting the difference between the reference signal stored in said first storage means and said output from said adaptive array processing means in a period when said adaptive array processing means outputs said first partial signal while outputting the difference between an output from said forced phase-locking means and said output from said adaptive array processing means in a period when said adaptive array processing means outputs said second partial signal, and
offset extraction means for extracting said frequency offset on the basis of the output from said error signal generation means.

3. The radio unit according to claim 2, wherein
said offset compensation quantity operation means includes:
second storage means for storing said offset compensation quantity at any time, and
calculation means calculating an update value θ' for said offset compensation quantity as:

$$\theta' = \theta + \mu \times \Delta\theta$$

on the basis of the offset compensation quantity θ stored in said second storage means and the output Δθ from said offset extraction means assuming that μ represents a prescribed coefficient.

4. The radio unit according to claim 2, wherein
said offset compensation quantity operation means includes:
second storage means for storing said offset compensation quantity at any time, and
calculation means calculating an update value θ' for said offset compensation quantity on the basis of the offset compensation quantity θ stored in said second storage means and the output Δθ from said offset extraction means while reducing the quantity changed in updating as the updating progresses.

5. The radio unit according to claim 4, wherein
said offset compensation quantity operation means further includes:
error detection means for detecting a receiving error, and
said calculation means calculates the update value θ' for said offset compensation quantity as:

$$\theta' = \theta + (\mu 0 \times \lambda^T) \times \Delta\theta$$

on the basis of the offset compensation quantity θ stored in said storage means and the output Δθ of said offset extraction means assuming that λ represents a prescribed positive coefficient less than 1 and μ0 represents an initial value of the coefficient μ while assuming that T represents a value corresponding to the number of updating opportunities allowing no detection of receiving errors.

6. The radio unit according to claim 4, wherein
said calculation means updates said offset compensation quantity every plurality of frames.

7. The radio unit according to claim 2, wherein
said offset compensation quantity operation means includes:
second storage means for storing said offset compensation quantity at any time, and
calculation means calculating an update value θ' for said offset compensation quantity on the basis of the offset compensation quantity θ stored in said second storage means and the output Δθ from said offset extraction means while increasing the quantity changed in updating in response to the magnitude of the absolute value of the output from said error signal generation means.

8. The radio unit according to claim 2, wherein
said offset compensation quantity operation means includes:
second storage means for storing said offset compensation quantity at any time, and
calculation means calculating an update value θ' for said offset compensation quantity,
i) on the basis of the offset compensation quantity θ stored in said second storage means and the output Δθ from said offset extraction means while increasing the quantity changed in updating in response to the magnitude of the absolute value of the output from said error signal generation means in a period when said adaptive array processing means outputs said first partial signal, or
ii) as:

$$\theta' = \theta + \mu \times \Delta\theta$$

in a period when said adaptive array processing means outputs said second partial signal, assuming that μ represents a prescribed coefficient.

9. The radio unit according to claim 1, wherein
said received signal is divided into a plurality of slots to be transmitted,
each said slot includes:
a first partial signal including a predetermined reference signal, and
a second partial signal including transmitted data, and
said offset quantity detection means includes:
forced phase-locking means forcibly synchronizing the phase of the output from said adaptive array processing means with a prescribed phase,
error signal generation means outputting the difference between an output from said forced phase-locking means and the output from said adaptive array process ing means in a period when said adaptive array processing means outputs said second partial signal, and offset extraction means for extracting said frequency offset on the basis of the output from said error signal generation means.

10. The radio unit according to claim 9, wherein said offset compensation quantity operation means includes:

second storage means for storing said offset compensation quantity at any time, and calculation means calculating an update value θ' for said offset compensation quantity as:

$$\theta' = +\mu \times \Delta\theta$$

on the basis of the offset compensation quantity θ stored in said second storage means and an output Δθ from said offset extraction means assuming that μ represents a prescribed coefficient.

* * * * *